United States Patent [19]

Andree

[11] Patent Number: 5,110,174
[45] Date of Patent: May 5, 1992

[54] PORTABLE WINDSHIELD ASSEMBLY FOR A RECREATIONAL VEHICLE

[75] Inventor: David A. Andree, Lexington, Ky.

[73] Assignee: Vista Enterprises, Inc., Lexington, Ky.

[21] Appl. No.: 614,397

[22] Filed: Nov. 16, 1990

[51] Int. Cl.⁵ .............................................. B60J 1/06
[52] U.S. Cl. .................................. 296/77.1; 296/96.21
[58] Field of Search .................... 296/77.1, 84.1, 96.21; 280/DIG. 5

[56] References Cited

U.S. PATENT DOCUMENTS

| | | | |
|---|---|---|---|
| 3,810,267 | 5/1974 | Fussell, Jr. et al. | 296/96.21 |
| 3,829,152 | 8/1974 | Hobbs | 296/78 |
| 3,843,982 | 10/1974 | Lane et al. | 296/96.21 |
| 4,013,315 | 3/1977 | West | 296/83 |
| 4,014,589 | 3/1977 | Yerkey | 296/78 |
| 4,343,503 | 8/1982 | Samuelson et al. | 296/84 |
| 4,773,695 | 9/1988 | Jones et al. | 296/77.1 |
| 4,792,175 | 12/1988 | Gerber | 296/79 |

Primary Examiner—Robert R. Song
Attorney, Agent, or Firm—King & Schickli

[57] ABSTRACT

A portable windshield assembly for a recreational vehicle such as a golf cart includes a pair of rigid windshield panels each received in a frame. Each frame is defined by support rails around the periphery of the panels. The inner side rails of the windshield panels are pivotally coupled together by a webbed joining hinge. The outer side rails of the windshield panels are coupled by webbed hinges to an upright assembly defined by truss panels that support the windshield panels in an upright position on the vehicle cowling. The assembly is mounted to the cowling by clamps that couple the truss panels to the rear marginal edge of the cowling. Hooked extendible cords are provided to secure the windshield panels in position on the cowling. T-shaped stabilizing clips engage upper and lower support rails of each windshield panel frame at the joining hinge thereby rigidifying the structure. In use, the windshield assembly attaches to the vehicle to protect passengers from flying insects, wind and entrained dust and debris.

18 Claims, 1 Drawing Sheet

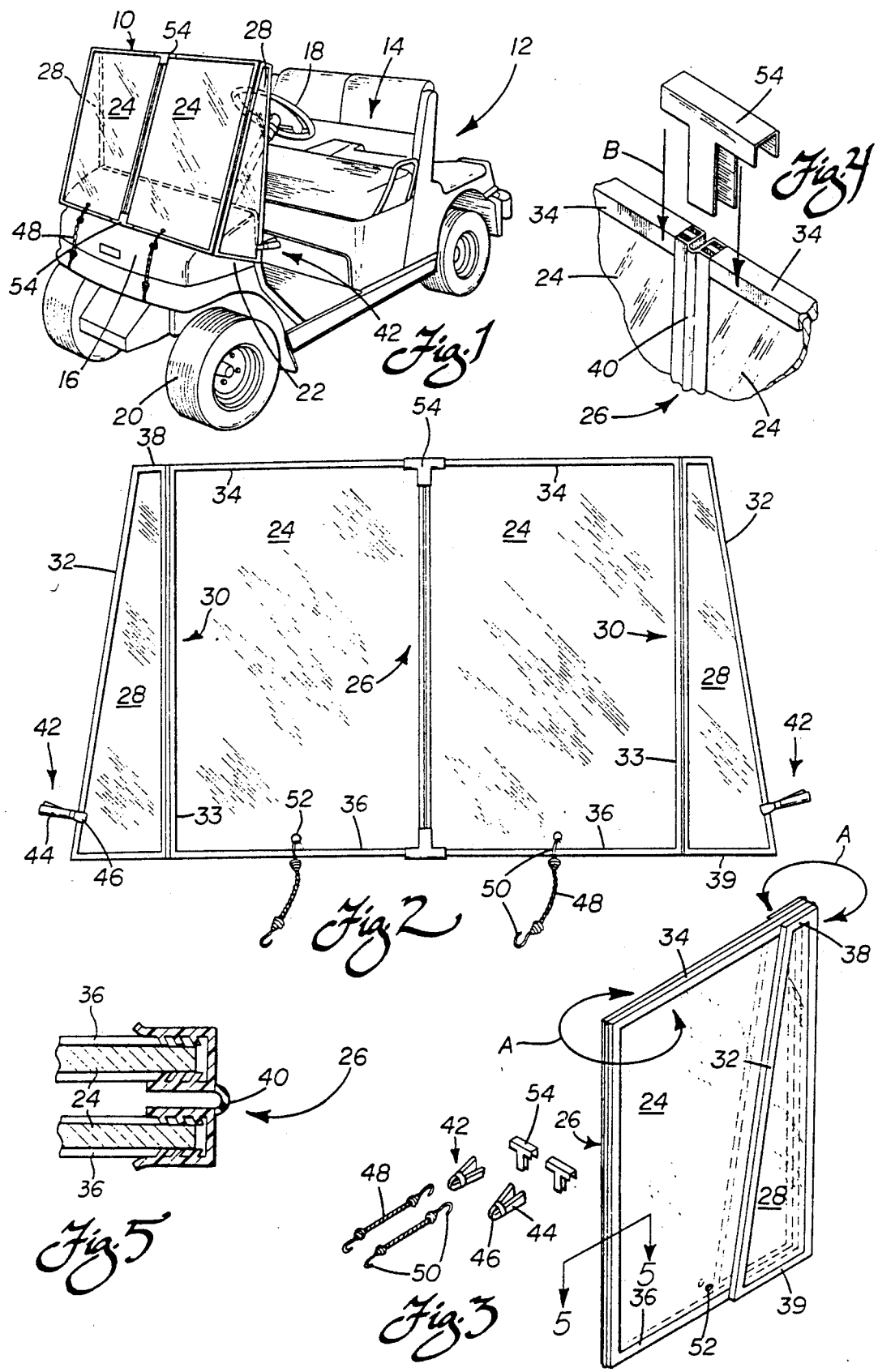

PORTABLE WINDSHIELD ASSEMBLY FOR A RECREATIONAL VEHICLE

TECHNICAL FIELD

The present invention relates generally to recreational vehicles, and more particularly, to a windshield assembly that is adapted to be attached to a recreational vehicle such as a golf cart to shield passengers from wind during use and is foldable into a compact configuration for easy portability.

BACKGROUND OF THE INVENTION

Recent technological advances have shortened the time to complete many job tasks, allowing individuals to enjoy pursuits away from the workplace more often. Many people are also opting for early retirement and with life spans continually increasing, these people take advantage of the pleasure offered by leisure time endeavors. Since there has been a considerable emphasis on maintaining health, more of these people are using their leisure time to participate in recreational activities. This is especially true of retirees who benefit tremendously by remaining active in later years. Thus, outdoor sports such as golf have enjoyed greatly increased popularity.

In order to speed play, many golfers ride in golf carts. Many carts are provided with canopies to protect occupants from direct exposure to the sun's rays while riding therein. However, the canopies are optional add-on features to the basic structural body of the golf cart and since this adds to the cost, a significant number of carts are used without canopies.

Most golf carts are also not manufactured with any type of windshield assembly. However, many golfers recognize the benefits provided by such a structure. More particularly, these structures are suited for protecting passengers from dust and debris that may be encountered in the air as the cart is in motion. In addition, a windshield assembly protects the passengers from exposure to chilling wind while in motion during the colder months. This is of particular importance to older people and those with blood circulation problems who need to maintain warmth in their hands to hold the clubs and strike the golf ball effectively.

Many attempts have been made to design a windshield assembly adapted to retrofit to a golf cart. Most are made of rigid polymeric material such as plexiglass and adapted to be mounted on the front of the cart in front of the passengers. Examples of such rigid windshield assemblies are disclosed in U.S. Pat. Nos. 3,829,152 to Hobbs; 4,343,503 to Samuelson et al; and 4,792,175 to Gerber.

While these designs provide sufficient protection, they have certain disadvantages and/or limitations. More particularly, all these designs require that the golf cart include a canopy or at least its supporting structure. Therefore they cannot be used on the many carts that do not include this optional feature. In addition, these windshield assemblies are not designed to fold into a compact configuration for easy portability.

U.S. Pat. Nos. 4,013,315 to West and 4,014,589 to Yerkey disclose portable windshield assemblies that a user may carry wherever he goes. These windshield assemblies are generally formed of a transparent, flexible sheet that extends along the front of the cart. While these sheets do block the wind, they are not as protective simply by their flexible nature as are rigid windshield assemblies. Further, these designs also require the cart to include a canopy for attachment and/or support.

A need is thus identified for a windshield assembly that is rigid to provide protection from both wind and flying dust and debris that is adapted for use on all golf carts regardless of the presence or absence of a canopy. The windshield assembly should also be capable of collapsing into a portable form to allow the user to carry it wherever he goes to play golf. The windshield assembly should be simple to manufacture and easy to attach to and detach from a golf cart.

SUMMARY OF THE INVENTION

It is thus an object of the present invention to provide a portable windshield assembly for a recreational vehicle such as a golf cart that overcomes the problems and disadvantages of the prior art.

It is still another object of the present invention to provide a portable windshield assembly for a recreational vehicle such as a golf cart that protects passengers from wind and debris while in operable position on the vehicle.

Still another object of the present invention is to provide a portable windshield assembly that is adapted for use on a golf cart regardless of the presence or absence of a canopy with its supporting structure.

An additional object of the present invention is to provide a lightweight windshield assembly for a recreational vehicle that is collapsible into a compact configuration for ease of portability.

It is a further object of the present invention to provide a portable windshield assembly for a recreational vehicle that is simple and economical to manufacture and easily mounted and removed from the vehicle.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a novel portable windshield assembly for a recreational vehicle such as a golf cart is provided. The windshield assembly is designed to be used with substantially all golf carts and advantageously does not require a canopy or its supporting structure for mounting. The assembly is easily attached to the golf cart to provide protection for the passengers from wind, dust and debris while in motion and is easily collapsible for portability by the user. Thus, the option of having a cart fitted with a windshield is always available to the user.

The windshield assembly preferably includes a plurality of windshield panels attached to an upright assembly adapted to support the panels in an upright position on the cowling of the vehicle. Commonly known mounting accessories are provided to mount the windshield assembly to the cowling as will be further described below.

Preferably two windshield panels that are positioned directly in front of the passengers are provided. The windshield panels are preferably formed of rigid, transparent polymeric material such as plexiglass. Each panel is received in a frame defined by support rails around the periphery of the panels. More particularly, the inner side rails of each windshield panel frame that receive adjacent edges of each panel are coupled by a webbed hinge to allow the panels to be easily folded. The outer side rails of each windshield panel frame are similarly coupled to the upright assembly by webbed hinges as will be further described below. Upper and lower support rails complete the peripheral frame.

The upright assembly preferably comprises a pair of truss panels, one panel being pivotally attached by a hinge to the outer edge of the left-most and right-most windshield panel. When in operative position, the truss panels are disposed in substantially perpendicular relation to the windshield panels, extending rearwardly toward the passenger area. More particularly, the pivotal attachment of the windshield panels to the truss panels through the webbed hinges allows the truss panels to be positioned so as to support the windshield panels in an upright position on the cowling of the vehicle.

In the preferred embodiment, the truss panels are formed of the same rigid, transparent polymeric material as the windshield panels. The truss panels are also received in a support frame similar to that of the windshield panels. In fact, the support frame holding the truss panels is sufficiently rigid to support the windshield panels in functional position on the cart without requiring the inclusion of the plexiglass within the frame.

As indicated above, the truss panel frames have inner side rails that pivotally mount the truss panels through a living hinge formed from a web of polymeric material to an adjacent windshield panel. The truss panel frames also have outer side rails that are clamped to the rear marginal edges of the cowling. Upper and lower horizontal rails are similarly provided along the appropriate edge of the truss panels to add rigidity.

The preferred embodiment of the invention utilizes a pair of spring loaded clamps to perform the clamping function. One clamp is operative to couple each of the truss panels to the cowling. The clamping attachment is thus easily accomplished and does not interfere with ingress into and egress from the passenger area of the cart.

The upper and lower support rails of the windshield panel frames are further employed to assist in stabilizing the windshield assembly when in use on the golf cart. More particularly, a pair of stabilizing clips are provided to couplingly engage the upper and lower support rails, respectively, of each windshield panel support frame. In the preferred embodiment, the stabilizing clips are substantially T-shaped. Thus, a leg of the clips further couplingly engages the webbed joining hinge thereby serving to rigidify that hinge. Thus, the stabilizing clips effectively prevent the windshield panels from inadvertently collapsing along the joining hinge under the force of air encountered as the golf cart is operated during use. While the preferred embodiment contemplates the use of clips along both the upper and lower support rails of the windshield panel support frame, it can be visualized that the invention is sufficiently stabilized with the use of a single stabilizing clip engaging either the upper or lower support rails.

Resilient or elastomeric connecting means are also provided to assist in mounting the windshield assembly to the golf cart. In the preferred embodiment, the connecting means takes the form of extendible rubber cords. More particularly, at least one cord for each windshield panel having hooks on opposing ends is provided. One hook is received in a hole formed near the lower support rail of the windshield panel frame. The other hook is engaged over the front bottom edge of the cowling to further secure the windshield panels to the cart.

There is thus provided a lightweight windshield assembly of simple construction that is easily collapsible into a compact configuration for portability. The assembly is adapted to be used with substantially all golf carts including those without a canopy or its supporting structure. The novel design is simple yet functional and provides advantages not indicated by the prior art.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 1 is a perspective view of a golf cart showing the windshield assembly according to the present invention mounted thereon;

FIG. 2 is a front elevational view of the portable windshield assembly in unfolded configuration;

FIG. 3 is a perspective view of the portable windshield assembly in a collapsed configuration for portability along with the separate mounting accessories;

FIG. 4 is an enlarged, fragmental view, partially broken away, showing the T-shaped stabilizing clip in preparation for attachment to the upper support rails of the windshield panel support frames; and FIG. 5 is a cross-sectional view of the hinge taken along the lines 5—5 in FIG. 3.

Reference will now be made in detail to the present preferred embodiment of the invention, an example of which is illustrated in the accompanying drawing.

DETAILED DESCRIPTION OF THE INVENTION

Reference is made to FIG. 1 illustrating the portable windshield assembly 10 according to the teachings of the present invention mounted in operative position on a golf cart 12. As is clearly shown, the cart 12 does not require a canopy or its supporting structure to provide an attachment site or support for the assembly 10 when mounted thereon.

Golf carts as well as other recreational vehicles generally are constructed with a passenger area 14 behind a front cowling 16. A steering wheel 18 extends into the passenger area 14 from the front cowling 16 and is operable by the driver to direct the cart. The cowling 16 generally overhangs the front wheels 20 and has substantially vertical side portions 22 that extend backward to a transition point between the cowling 16 and the passenger area 14. While some carts further include a canopy, such a structure is an optional feature and as will become apparent by viewing the description below, is not required for use of the inventive windshield assembly 10.

In the preferred embodiment, the windshield assembly 10 includes a plurality of transparent windshield panels 24 that are positioned directly in front of the passenger area 14 when in operable position on the cart 12. The accompanying drawing shows the invention as having two windshield panels 24 joined together at a hinge 26 formed from a web of polymeric material and described in greater detail below. It has been found that the preferred embodiment including two windshield panels 24 provides the optimum design to perform its protective function when in use while allowing collapsibility to a compact configuration for convenient portability. It should be appreciated however, that the windshield assembly 10 could also be formed with a continuous panel or more than two panels as desired.

The windshield panel assembly is connected at the left-most and right-most edges to an upright assembly that supports the windshield panels 24 in an upright position on the cowling 16. In the preferred embodiment, the upright assembly includes a pair of truss panels 28 attached to the outer edges of the windshield panels 24 by hinges 30. The hinges 30, like the hinge 26, are also formed from a web of polymeric material. The hinges 30 between the windshield panels 24 and the truss panels 28 allow the truss panels to be pivoted to a position substantially perpendicular to the windshield panels and extending backward therefrom towards the passenger area 14 when mounted on the cart 12.

When in operative position on the cart 12, the windshield panels 24 extend upward from the cowling 16 to a sufficient height in front of the passengers to protect them from wind and entrained dust and debris, particularly when in motion. The truss panels 28 extend backwards toward the passenger area 14 in substantially perpendicular relation to thus form an upright support for the windshield panels 24 on the cowling 16.

In order to provide sufficient protection from wind and foreign objects, the windshield panels 24 are formed of rigid polymeric material such as plexiglass. The panels 24 are transparent to allow the passengers an unobscured field of vision in front of the cart 12. The panels 24 may be tinted in order to reduce glare.

Each of the windshield panels 24 and the truss panels 28 is received in a frame defined by rails around the periphery of the panels. Each panel frame has vertical side rails that are pivotally joined together by a web of polymeric material forming integral hinges 26, 30. More particularly, the inner side rails of the windshield panels 24 are pivotally joined by the integral web hinge 26. The outer side rails of the windshield panels 24 are pivotally connected to the inner side rails of the truss panels 28 by the integral web hinges 30. The truss panels 28 also have outer side rails 32 that form an attachment site for the truss panels to the side portions 22 of the cowling 16 when in operable position. The windshield panels 24 have upper and lower support rails 34 and 36, respectively, to complete the peripheral windshield panel frame. The upper and lower rails 34, 36 are utilized in the operative positioning of the windshield assembly 10 on the golf card 12 as will be further described below. The truss panels 28 further have upper and lower rails 38 and 39, to complete the truss panel frames.

In the preferred embodiment, the truss panels 28 are also formed of rigid polymeric material such as plexiglass to assist in wind deflection. However, it should be noted that the upright assembly supporting the windshield panels 24 on the cowling 16 in an upright position may simply consist of the support frame defined by the rails without the inclusion of the plexiglass. Such a structure is, of course, lighter in overall weight. In e further alternative, the upper reinforcing rails 38 of the truss panels 28 may be eliminated so that the truss panels form a triangular structure rather than a trapezoidal structure.

The webbed hinges 26, 30 pivotally joining the panels 24, 28 may be formed from polymeric strips 40 (see particularly FIGS. 4 and 5). The strips 40 are bonded to the appropriate side rails of the panel support frames to establish a secure but flexible relationship between adjacent panels. Alternatively, the hinges 26, 30 may be integrally formed with the frame rails. Either way, the hinged coupling between the panels 24, 28 advantageously allows them to easily fold upon one another as shown in FIG. 3 (note action arrows A) into a compact configuration for easy portability. The use of polymeric material provides for long lasting service and prevents rust and other damage due to exposure to the elements. However, it should be appreciated that any type of coupling hinge is suitable for use.

The portable windshield assembly 10 is further provided with simple and commonly known means for attaching the assembly to the golf cart 12. More particularly, the preferred embodiment of the invention includes a pair of spring loaded clamps 42 used to attach the truss panels 28 to the marginal rear edge of the side portions 22 of the cowling 16. The clamps 42 allow easy manual operation by squeezing handles 44 to open the gripping members 46 for placement over the truss panels 28 and the cowling 16 (see FIGS. 1 and 2). When the handles are released, the spring loading serves to clamp the gripping members 46 tightly together. The clamps 42 then provide a strong gripping force that secures the outer rails 32 of the truss panels 28 to the cowling 16. Advantageously, since the clamps 42 engage the rails 32, damage to the truss panels 28 is prevented. In addition, it should be appreciated that the clamps 42 do not protrude significantly into the entryway for the passenger area 14. Thus, it is still easy to enter and exit the golf cart 12 even when the present invention is in use.

Resilient bands are provided to be used in combination with the clamps 42 to secure the windshield assembly 10 on the cart 12. In the preferred embodiment, the resilient bands are extendible rubber cords 48 with hooks 50 at each end. The hooks 50 connect the windshield panels 24 and the front cowling 16 to provide additional attachment security during use. More particularly, one hook 50 is received within a hole 52 drilled in the windshield panel 24 near the lower support rail 36. The cord 48 is then stretched and the other hook 50 is secured to the front bottom edge of the cowling 16. The rubber cords 48 allow the windshield assembly 10 to be used with carts 12 having various sized cowlings.

In accordance with a further aspect of the invention, the windshield assembly 10 may be further stabilized in use on the cart 12 by means of clips 54 that engage the upper and lower support rails 34, 36 of the windshield panel frames. Preferably, the stabilizing clips 54 are T-shaped. Accordingly, one leg of a first clip 54 couplingly engages the upper support rails 34 of the windshield panels 24 at the hinge 26. The other leg of the T-shaped clip 54 extends vertically along the joining hinge 26 for rigid support. Similarly, a second clip 54 may be positioned to engage the lower support rails 36 of the windshield panels 24. The other leg of this clip 54 also engages the inner side rails over the hinge 26. Thus, the clips 54 provide additional strength and security to prevent the windshield panels 24 from inadvertently collapsing while in position on the cart.

The installation of the T-shaped stabilizing clip 54 along the upper support rails 34 of the windshield panel frames is shown in FIG. 4 (note action arrows B). The stabilizing clip 54 placed along the lower support rails 36 of windshield panel frames is installed in a similar but opposite manner with the vertical leg along the joining hinge 26. It can be appreciated that while the preferred embodiment contemplates stabilizing clips 54 being used along both the upper and lower support rails 34, 36, the provision of a clip 54 solely along either of the upper or lower support rails provides sufficient stabilization under ordinary conditions to prevent inadvertent collapsing of the windshield panels 24.

As should be appreciated from above, the windshield assembly 10 provides a lightweight and simple structure that a golfer can carry with him wherever he goes that may be readily and conveniently positioned on a golf cart 12. This may be done whenever the golfer desires to have protection from wind, dust and debris. The assembly 10 is collapsible into a compact configuration as shown in FIG. 3 that is easily transportable. Although not shown, a carrying case may be designed in which to put the windshield assembly 10 for transportation. The case may include carrying handles for added convenience.

To place in operative use on the golf cart 12, the assembly 10 is unfolded from its transportable configuration. The T-shaped stabilizing clips 54 are placed in position along the upper and lower support rails 34, 36 of the windshield panel frames at the joining hinge 26. The assembly 10 is next positioned on the cowling 16 so that the windshield panels 24 are directly in front of the passenger area 14. The truss panels 28 are pivoted to extend substantially perpendicularly to the windshield panels 24 backwards toward the passenger area 14. The truss panels 28 are clamped to the marginal edge of the side portions 22 of the cowling 16 with the use of the hand clamps 42. One of the hooks 50 of each rubber cord 48 is placed through the hole 52 formed in the windshield panels 24. The other hook 50 is then secured to the front bottom edge of the cowling 16. The windshield assembly 10 is thus positioned on the golf cart 12 to protect passengers sitting in the passenger area 14 from foreign objects, wind and entrained debris while the cart 12 is traveling.

In summary, numerous benefits result from the use of the present invention. There is provided a windshield assembly 10 formed of rigid windshield panels 24 that protect the passengers of the cart 12 from wind, dust and debris. An upright assembly formed of truss panels 28 supports the windshield panels 24 in an upright position on the cowling 16 of the cart 12. Thus the windshield assembly 10 is adapted for use on substantially all golf carts 12, regardless of the presence or absence of a canopy with its supporting structure, which is required in prior art windshield assembly designs. The assembly 10 is provided with polymeric strips 40 that couple adjacent panels 24, 28 together and form hinges 26, 30 that allow the panels to fold compactly upon one another. Thus the assembly is easily collapsible into a portable configuration. The assembly 10 is of simple construction, utilizing few operative parts and yet is functional with great efficiency to protect passengers when placed in operative position.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. A portable windshield assembly for a recreational vehicle having a cowling and a passenger area, comprising:
   at least one windshield panel;
   an upright assembly attached to said windshield panel and supporting said windshield panel in an upright position directly on said cowling;
   means for collapsing said windshield assembly into a compact configuration for ease of portability; and
   means for mounting said portable windshield assembly directly to said cowling, said upright assembly and mounting means functioning together so as to fully independently support said windshield assembly in an upright position.

2. The portable windshield assembly as in claim 1, wherein said at least one windshield panel is rigid.

3. The portable windshield assembly as in claim 1, further including means for pivotally mounting said upright assembly to said at least one windshield panel.

4. The portable windshield assembly as in claim 3, wherein said pivotal mounting means comprises at least one hinge.

5. A portable windshield assembly for a recreational vehicle having a cowling and a passenger area, comprising:
   at least one windshield panel;
   an upright assembly attached to said windshield panel and supporting said windshield panel in an upright position on said cowling, said upright assembly comprising a truss member pivotally attached to each opposing side of said at least one windshield panel; and
   means for mounting said portable windshield assembly to said cowling.

6. The portable windshield assembly as in claim 5, wherein said truss members are substantially perpendicularly disposed to said at least one windshield panel when in operative position.

7. The portable windshield assembly as in claim 6, wherein each said truss member comprises a panel received in a support frame including inner and outer rails.

8. The portable windshield assembly as in claim 7, wherein said truss panel is rigid.

9. The portable windshield assembly as in claim 7, wherein said mounting means includes clamp means operative to couple said outer reinforcing rail of said truss panel to said cowling.

10. The portable windshield assembly as in claim 1, wherein a pair of windshield panels is provided, each windshield panel being received in a frame including inner and outer side rails, said inner side rails of each support frame being pivotally connected together.

11. The portable windshield assembly as in claim 10, wherein said pivotal connecting means comprises at least one hinge.

12. The portable windshield assembly as in claim 11, wherein said frames further include upper and lower support rails.

13. The portable windshield assembly as in claim 12, further including a stabilizing clip that couplingly engages the upper support rails of each windshield panel frame.

14. The portable windshield assembly as in claim 13, further including a stabilizing clip that couplingly engages the lower support rails of each windshield panel frame.

15. The portable windshield assembly as in claim 14, wherein said stabilizing clips are substantially T-shaped, a leg of said T-shaped clips couplingly engaging said hinge.

16. The portable windshield assembly as in claim 1, wherein said mounting means includes means for removably clamping said upright assembly to said cowling.

17. The portable windshield assembly as in claim 16, wherein said mounting means further includes resilient connecting means in combination with said clamp means.

18. The portable windshield assembly as in claim 17, wherein said resilient connecting means includes at least one extendible cord having hooks on opposing ends.

* * * * *